Patented Aug. 7, 1928.

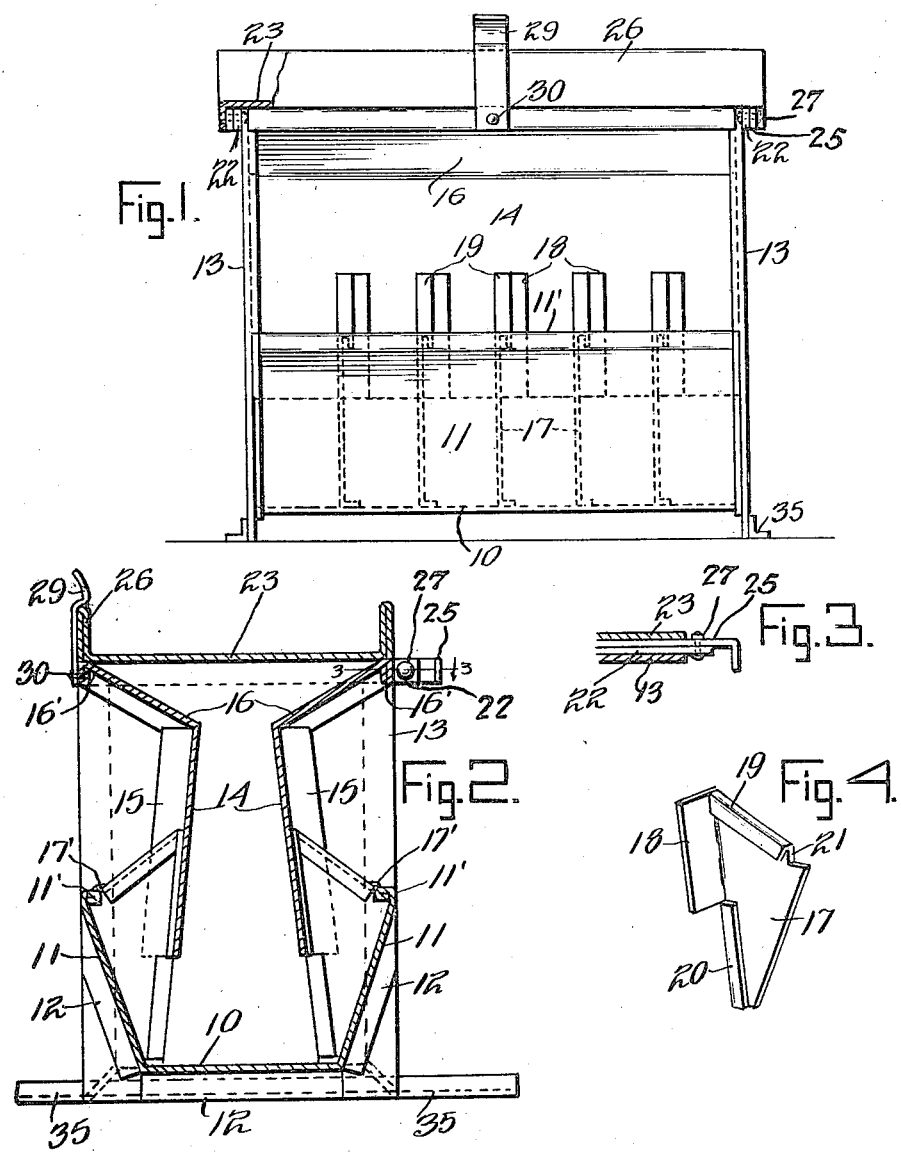

1,680,181

UNITED STATES PATENT OFFICE.

JOHN D. SMITH, OF TIPTON, INDIANA.

CHICKEN FEEDER.

Application filed September 14, 1926. Serial No. 135,417.

A disadvantage experienced in the use of poultry feeders of common constructions is the waste or scattering of the feed by the poultry during the process of feeding by reason of "billing" which results in scattering the feed from side to side or throwing it out of the feeder where it is wasted. An object of my said invention is to provide a construction of feeder so arranged that the feed will be consumed by the poultry as it is fed from the main container to the trough and in which the trough is separated into several compartments, in each of which a substantially uniform volume of feed will be maintained, so as to prevent the feed from being distributed and wasted from side to side, or over the front of the trough, by the billing or pecking of the fowls, all as will be hereinafter more fully described and claimed.

Referring to the accompanying drawings which are made a part hereof and on which similar reference characters indicate similar parts, Figure 1 is a side elevation, Figure 2, a vertical section taken at right angles to Figure 1, Figure 3, a detail section on line 3—3 of Figure 2, and Figure 4, a detail of one of the separators.

In the drawings reference character 10 indicates an elongated trough having a bottom with side members 11 inclined relative thereto, the ends of said bottom and side members being provided with flanges 12 which are welded or secured in any other desired manner to end members 13 preferably rectangular in shape said end members are bent over around their margins to provide smooth edges.

A pair of side members are provided which have laterally extending flanges secured preferably by rivets, welding or the like to the rectangular end members 13, and said side members form with said end members a hopper or container for the material to be fed out from the same. Each side member is provided with upper and lower portions inclined from the horizontal. The upper shorter portions 16 form a flared mouth which serves as a funnel for the hopper while the lower portions 14 form a flared receptacle which terminates in spaced relation from the bottom of the trough but below the upper edges of the same so that the feed for which the device is particularly designed may pack between the sides. On account of the inclination of the opposed sides, the lower portion of the hopper being larger than the upper portion, when the feed is pecked by the poultry from each side within the trough the feed above will slide downwardly freely into the trough. This structure will prevent clogging or stoppage of the hopper and as long as there is any feed within the same it will gravitate into position to be consumed.

In order to keep the fowls from billing the feed sideways during their feeding I provide a plurality of separators 17 (Fig. 4) each provided with a flange 18 adapted to be secured by welding or the like as at 17' to the lower portion of the side members of the feeder and having its upper portion turned over at 19 to provide a smooth edge to prevent injury to the poultry. The separator is also bent over at 20 along its inner edge to reinforce the same and to provide the least possible obstruction to the passage of the mash from the hopper. These separators are preferably secured in spaced relation between the side of the hopper and the side of the trough and the upper edge of the trough is bent over at 11' and fits into a recess 21 of the separator thus holding the same in position, and forming an obstruction for feed which ordinarily would be pecked or billed out of the trough by the poultry feeding in the bottom of the trough. The part of the feed which would ordinarily be thrown out will therefore be deflected back into the trough instead of being thrown over the edges and wasted. The upper edges of the side members are bent under at 16' to reinforce the same and a reinforcing strip 22 is secured along the upper margin of each end of the feeder and to form a support for a lid 23. The sides of the lid or top are bent upwardly and downwardly upon themselves to form smooth edges for the lid and to reinforce the same. The ends of the lid are preferably left open so that rain will readily drain off the ends of the feeder instead of draining into the feed trough or down the sides of the device. The lid 23 is provided with reinforcing bars 25 which extend outwardly beyond the sides of the same and are provided at their extremities with inturned portions 26 adapted to engage the edge of the end walls of the feeder and limit the movement of the top, which is pivotally mounted by means of a bolt 27 on the reinforcing strip 22 of the upper end of the feeder. A catch 29 is secured at 30, at substantially the middle of the side of the feeder opposite that upon which the lid is pivoted, for securing the lid in closed position.

In the above construction it will be understood that the edges of the members which would normally be exposed are turned over so that the poultry are prevented from injuring themselves thereon.

In order to prevent the feeder from being tipped over I provide angle iron feet or side braces 35 which extend for a short distance beyond the sides of the feeder.

It will be obvious to those skilled in the art that various changes may be made in my device without departing from the spirit of the invention and therefore I do not limit myself to what is shown in the drawings and described in the specification but only as indicated in the appended claims.

Having thus fully described my said invention, what I claim as new and desire to secure by Letters Patent, is:

1. A poultry feeder comprising a trough, a hopper supported above said trough in spaced relation to the bottom of the same and providing a feed opening between the sides of the trough and the hopper, substantially triangular separator plates disposed transversely between the sides of the trough and the hopper and dividing said feed openings into compartments, said separator plates having their upper edges bent over to provide reinforcing flanges between the upper edges of the trough and the sides of the hopper, said separator plates having lateral flanges secured to the hopper and having their upper portions cut away to accommodate the upper edges of the trough, a top pivotally mounted on one side of the hopper, a latch at the opposite side of the hopper for holding the top in closed position, and reinforcing bars for each end of said top, said reinforcing bars having extensions projecting beyond the pivotally supported side of the top, said extensions being turned inwardly to engage a portion of the feeder for limiting the pivotal movement of the top, substantially as set forth.

2. A poultry feeder comprising a trough, a hopper supported above said trough in spaced relation to the bottom of the same and providing a feed opening between the sides of the trough and the hopper, separator plates disposed transversely between the sides of the trough and the hopper and dividing said feed openings into compartments, a top pivotally mounted on one side of the hopper, a latch at the opposite side of the hopper for holding the top in closed position, and reinforcing bars for each end of said top, said reinforcing bars having extensions projecting beyond the pivotally supported side of the top, said extensions being turned inwardly to engage a portion of the feeder for limiting the pivotal movement of the top, substantially as set forth.

In witness whereof, I have hereunto set my hand at Indianapolis, Indiana, this 6th day of September, A. D. nineteen hundred and twenty-six.

JOHN D. SMITH.